Sept. 27, 1960 W. E. CORSON 2,954,101
VEHICLE WHEEL CHOCK
Filed Jan. 19, 1959
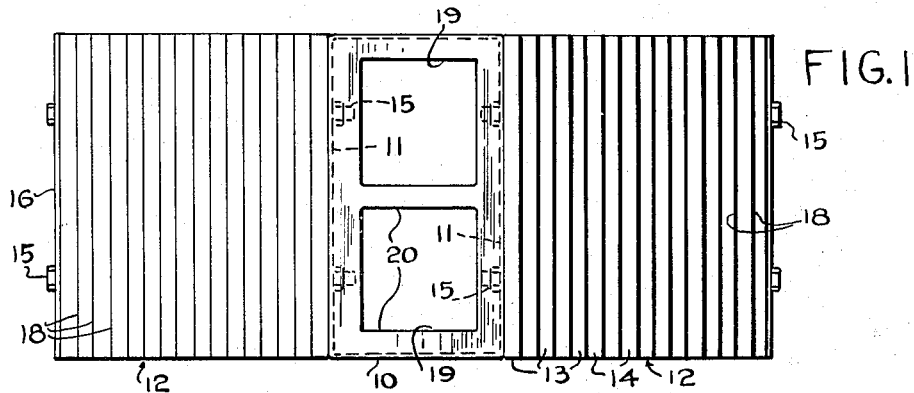
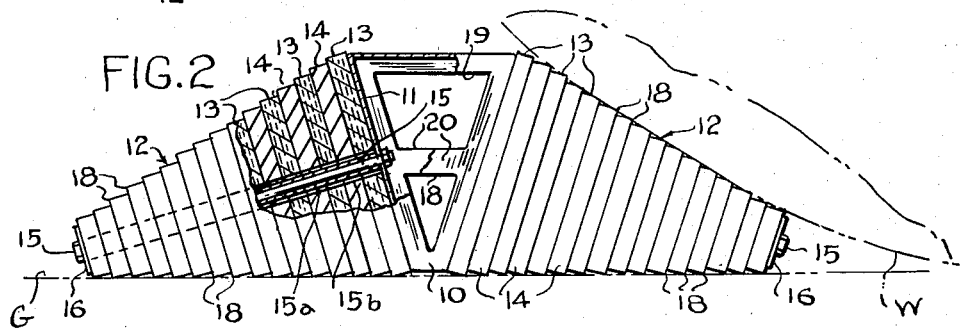
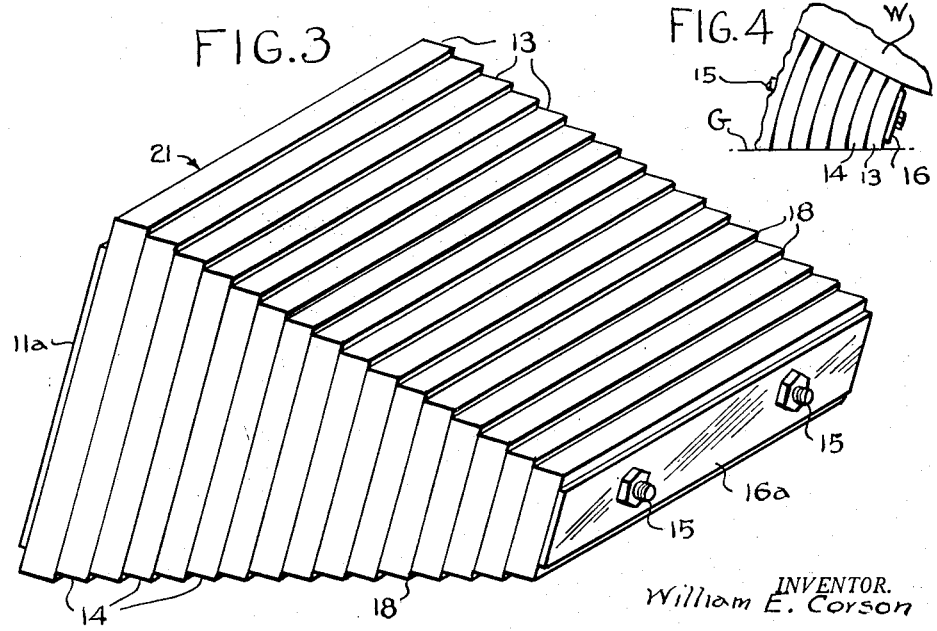
INVENTOR.
William E. Corson
BY
William Cleland
Attorney

United States Patent Office 2,954,101
Patented Sept. 27, 1960

2,954,101

VEHICLE WHEEL CHOCK

William E. Corson, 101 Beauparc Drive, Akron, Ohio

Filed Jan. 19, 1959, Ser. No. 787,563

12 Claims. (Cl. 188—32)

This invention relates to a chock for blocking truck wheels or the like.

Truck wheel chocks have been generally made of solid material, such as wood. Even when such chocks were provided with non-slip projections on the frictionally engaged surfaces there was a tendency for the same to slip under the pressure of the wheels being blocked. Moreover, such chocks wore out quickly due to slippage and abuse in use.

One object of the invention is to provide an improved wheel blocking chock having self-operating non-slip means adapted to grip the ground more tenaciously as pressure is applied thereto by a wheel being blocked.

Another object of the invention is to provide a wheel chock of the character described which will have long lasting qualities under normal use and abuse of the same.

Other objects of the invention will be manifest from the following brief description and the accompanying drawings.

Of the accompanying drawings:

Figure 1 is a top plan view of a double-wedge chock unit, embodying the features of the invention.

Figure 2 is a front elevation thereof, partly broken away and in sections.

Figure 3 is a perspective view, of a single-wedge chock embodying a modified form of the invention.

Figure 4 is a fragmentary front view, corresponding to portions of Figures 1, 2, and 3, but illustrating the condition of the respective chocks under the pressure of a wheel being wedged.

Referring to Figures 1 and 2 of the drawings, the numeral 10 designates a double wheel chock, including hollow wedge-shaped divider of rigid material, such as metal, providing laterally spaced, downwardly converging walls 11, 11, which serve as backing plates for oppositely disposed, resilient wedge units 12, 12.

Each unit 12 may be composed of a lamination of superposed, separate rectangular layers of pads 13, 13 and 14, 14, alternately of two kinds of resilient shock-absorbing material, and being of substantial thickness, as shown. These superposed layers 13 and 14 are of progressively decreasing vertical widths laterally of the chock, to define a wedge-shaped block, and are held clamped together by means of laterally spaced bolts 15, 15 extending between a metal plate 16, against the outer face of the smallest rectangular layer, and the corresponding wall 11 of the hollow divider 10.

As shown in Figure 2, each bolt 15 may be received through a spacer sleeve 15a extended between the wall 11 and plate 16, the sleeve being loosely received through aligned openings 15b in the layers 13 and 14, thereby to permit requisite slippage between said layers in a manner to be described later. In some instances, however, the sleeve 15a may be omitted, so that the layers will be loosely mounted directly on the bolt 15.

The layers 13 may be of durable rubberized fabric, fabric, or other reinforced vulcanized rubber or the like, adapted to absorb heavy blows which yieldingly depress inwardly, edgewise of the layers. Layers 14 may be of more flexible, elastic material, such as vulcanized rubber.

The superposed layers 13 and 14 of the wedge units are arranged to have the lower edges thereof generally in a horizontal plane, or in the plane of a supporting surface, and the upper edges of said layers of the two wedge units lie generally in angularly disposed planes which are at suitable inclination to said horizontal plane for engagement thereof by a truck wheel W, as shown in chain-dotted lines in Figure 2. The top and bottom edges of the superposed, though narrowing layers of the units are squared, with respect to the parallel surfaces of the layers, thereby to present laterally spaced tooth-like non-slip edges or corners 18, 18, both to the ground surface G, and to the usual pneumatic tire tread of wheel W.

Openings 19, 19 in the top and side walls of the divider 10 define cross-bars 20, 20 which may be utilized either for lifting the chock, or for attachment of an anchorage chain (not shown).

In use of the double chock of Figures 1 and 2, for blocking a vehicle wheel W, as shown in full and chain-dotted lines in Figure 2, pressure of the tread portions of a pneumatic tire of the wheel, against the upper tooth-like edges of the superposed layer of one unit 12, will cause the corresponding layers to be more or less individually urged toward firm non-slip engagement of the lower edges of the layers 13 and 14, with the ground surface G, as shown in Figure 4. At the same time said upper edges of the layers effectively grip the tread portion of the tire on wheel W, to hold the same firmly against rolling action. The double chock is particularly useful in connection with trucks or tractor trailers having tandem wheels.

While sudden impact on the wheel W will be generally absorbed by the resiliency of the laminated layers 13 and 14, the initial shock is absorbed by the relatively less resilient fabric-reinforced layers 13, which in turn are yieldingly supported between adjacent, more resilient layers 14. Flexing and edgewise yielding depression of the fabric-reinforced layers 13 is enhanced by the fact that the adjacent layers 13 and 14 are not adhered or attached to each other, particularly at the marginal portion of the layers where the most severe flexing and depressive forces are applied. In any event, under continued pressure of the wheel W, the individual layers tend to bow transversely outwardly of the wheel, with adjacent corner edges separated, and thereby to provide a slip-resistent wiping or squeegee action against the ground surface and the tire tread (Figure 4). The resilient units 12 are adapted to have maximum wear resistance under continued frictional rubbing and impact stresses.

Referring now to Figure 3, there is illustrated a single resilient chock unit 21, which is in all respects like one of the resilient chock units 12 of Figures 1, 2 and 4, except that the superposed layers 13 and 14 of rubber and fabric-reinforced rubber are bolted or otherwise clamped between opposite clamping plates 11a and 16a. Like parts, therefore, have been given like numerals unless otherwise noted. Unit 21, however, is vertically reversible to have either of the two serrated or tooth-edged sides engaging the ground, in use to block a wheel as described above.

Other modifications of the invention may be resorted to without departing from the spirit of the invention, or the scope of the appended claims.

What is claimed is:

1. A chock for blocking vehicle wheels or the like, comprising a central member having downwardly converging walls, series of superposed pads extending laterally outwardly from each of said walls, each pad having vertically opposite parallel edges, means for clamping said series of pads in superposed relation on the respective said walls to have adjacent parallel edges of the pads coextending, said pads being of progressively decreasing widths to define wedge-shaped blocks the bottom edges of which extend in a horizontal plane and the upper edges of which extend generally in planes which diverge at opposite inclinations to said horizontal plane.

2. A chock as set forth in claim 1, said opposite parallel edges of the superposed pads of each block being squared to expose opposite series of tooth-like edges.

3. A chock as set forth in claim 1, wherein said means for clamping each said block including a plate on the laterally outermost face of the block and clamping means connected between said plate and the respective said wall of the central member.

4. A chock as set forth in claim 1, wherein said means for clamping each said block includes a plate on the laterally outermost face of the block and spaced clamping bolts extending through the respective series of superposed pads and clampingly connected between said plate and the respective said wall of the central member, to permit limited sliding action between the pads, said superposed pads of each of said blocks being alternately of elastic material and relatively less elastic material.

5. A chock for blocking vehicle wheels or the like, comprising a plurality of superposed pads, each having opposite generally coextending side edges, means for retaining said pads in superposed relation, to have the adjacent said side edges coextending, said pads being of progressively decreasing widths to define a wedge-shaped block, said means for retaining including rigid members at opposite ends of said block and means extending through the pads for clamping said members together.

6. A chock for blocking vehicle wheels or the like, comprising a plurality of superposed pads, each having opposite generally coextending side edges, means for retaining said pads in superposed relation, to have the adjacent said side edges coextending, said pads being of progressively decreasing widths to define a wedge-shaped block, said superposed pads being alternately of elastic material and relatively less elastic material, said means for retaining including rigid members at opposite ends of the block and spaced clamping means urging the members together, the opposite said side edges of said pads being transversely formed to expose opposite series of edge portions.

7. A chock for blocking vehicle wheels or the like, comprising a plurality of superposed pads, each having opposite generally coextending side edges, means for retaining said pads in superposed relation, to have the adjacent said side edges coextending, said pads being of progressively decreasing widths to define a wedge-shaped block, wherein said superposed pads are mounted on said means for clamping to have limited sliding movement with respect to each other when the lower edges of the pads are depressed against a horizontal surface by a vehicle wheel pressing against the upper edges thereof.

8. A chock for blocking vehicle wheels or the like, comprising a series of superposed pads of elastic material, each pad having vertically opposite parallel edges, means for retaining said series of pads with adjacent surfaces thereof in non-adhered superposed relation, said pads having adjacent parallel edges thereof coextending, said pads being of progressively decreasing widths to define a wedge-shaped block with the bottom edges of the pads extending in a horizontal plane and the upper edges of the pads extending generally in a plane which diverges at an inclination to said horizontal plane.

9. A chock as set forth in claim 8, said opposite parallel edges of the superposed pads of said block being squared to expose opposite series of tooth-like corner edges.

10. A chock as set forth in claim 8, wherein said means for clamping each said block includes a plate on the laterally outermost faces of the block and spaced clamping bolts extending through said series of superposed pads and clampingly connected between said plates.

11. A chock as set forth in claim 8, wherein said means for clamping said block includes plates on the laterally outermost faces of the block and spaced clamping bolts extending through the respective series of superposed pads and clampingly connected between said plates, said superposed pads of each of said blocks being alternately of elastic material and relatively less elastic material.

12. A chock for blocking vehicle wheels or the like, comprising a series of superposed pads of elastic material, each pad having vertically opposite parallel edges, means for retaining said series of pads with adjacent surfaces thereof in non-adhered superposed relation, said pads having adjacent parallel edges thereof coextending, said pads being of progressively decreasing widths to define a wedge-shaped block with the bottom edges of the pads extending in a horizontal plane and the upper edges of the pads extending generally in a plane which diverges at an inclination to said horizontal plane, said superposed pads being mounted on said means for retaining the same to have limited movement between the adjacent pads when the lower edges of the pads are depressed against a horizontal surface by a vehicle wheel pressing against the upper edges thereof.

References Cited in the file of this patent

UNITED STATES PATENTS

| | | |
|---|---|---|
| 1,893,580 | Colley | Jan. 10, 1933 |
| 1,981,182 | Lyons | Nov. 20, 1934 |
| 2,649,295 | Schuyler | Aug. 18, 1953 |

FOREIGN PATENTS

| | | |
|---|---|---|
| 234,838 | Switzerland | Feb. 16, 1945 |